July 14, 1942.  E. A. BERGLUND  2,289,567
VALVE
Filed March 7, 1938  4 Sheets-Sheet 1
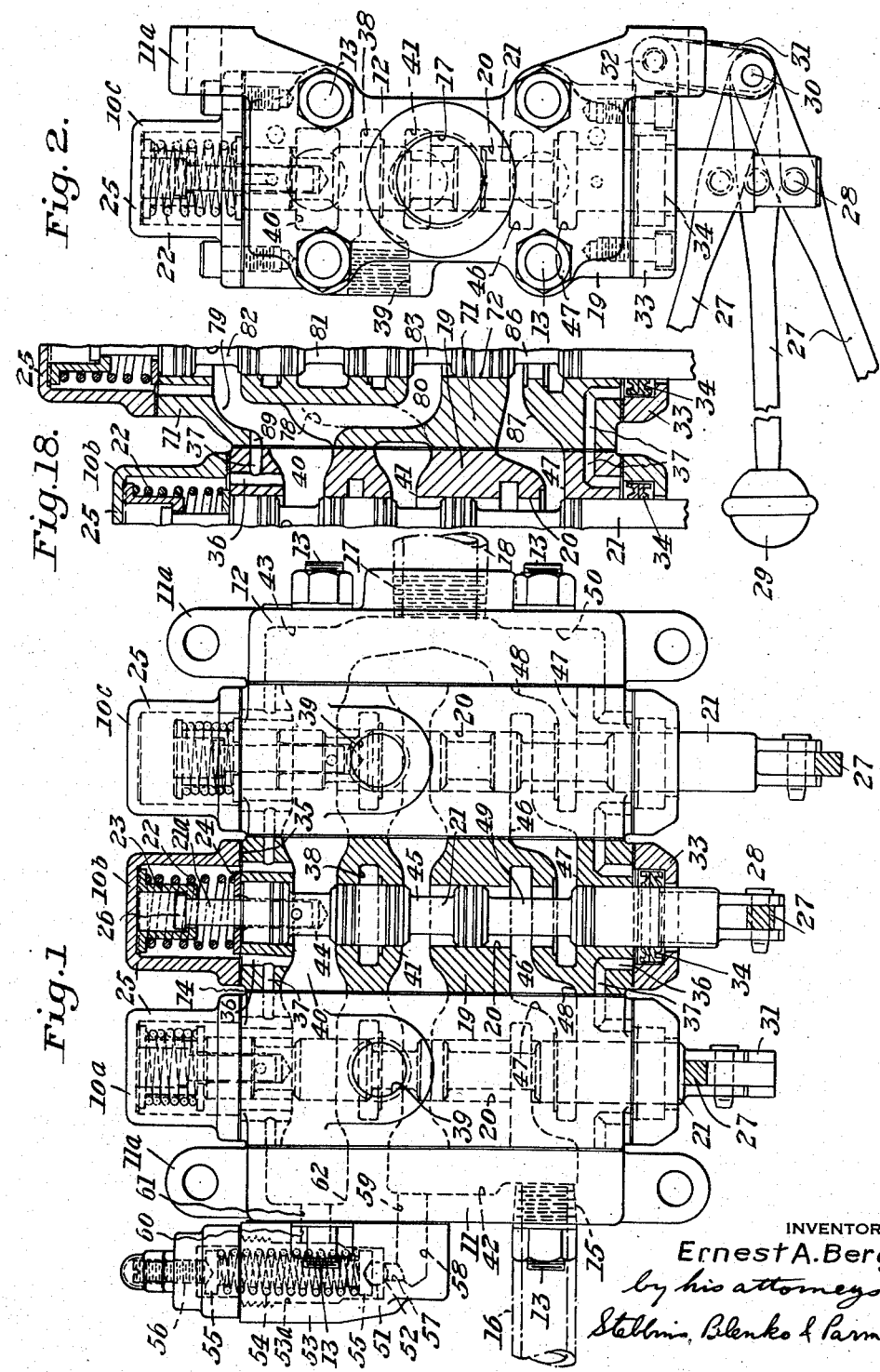
INVENTOR
Ernest A. Berglund
by his attorneys
Stebbins, Blenko & Parmelee July 14, 1942.  E. A. BERGLUND  2,289,567
VALVE
Filed March 7, 1938  4 Sheets-Sheet 2

INVENTOR
Ernest A. Berglund
by his attorneys
Stebbins, Blenko
& Parmelee

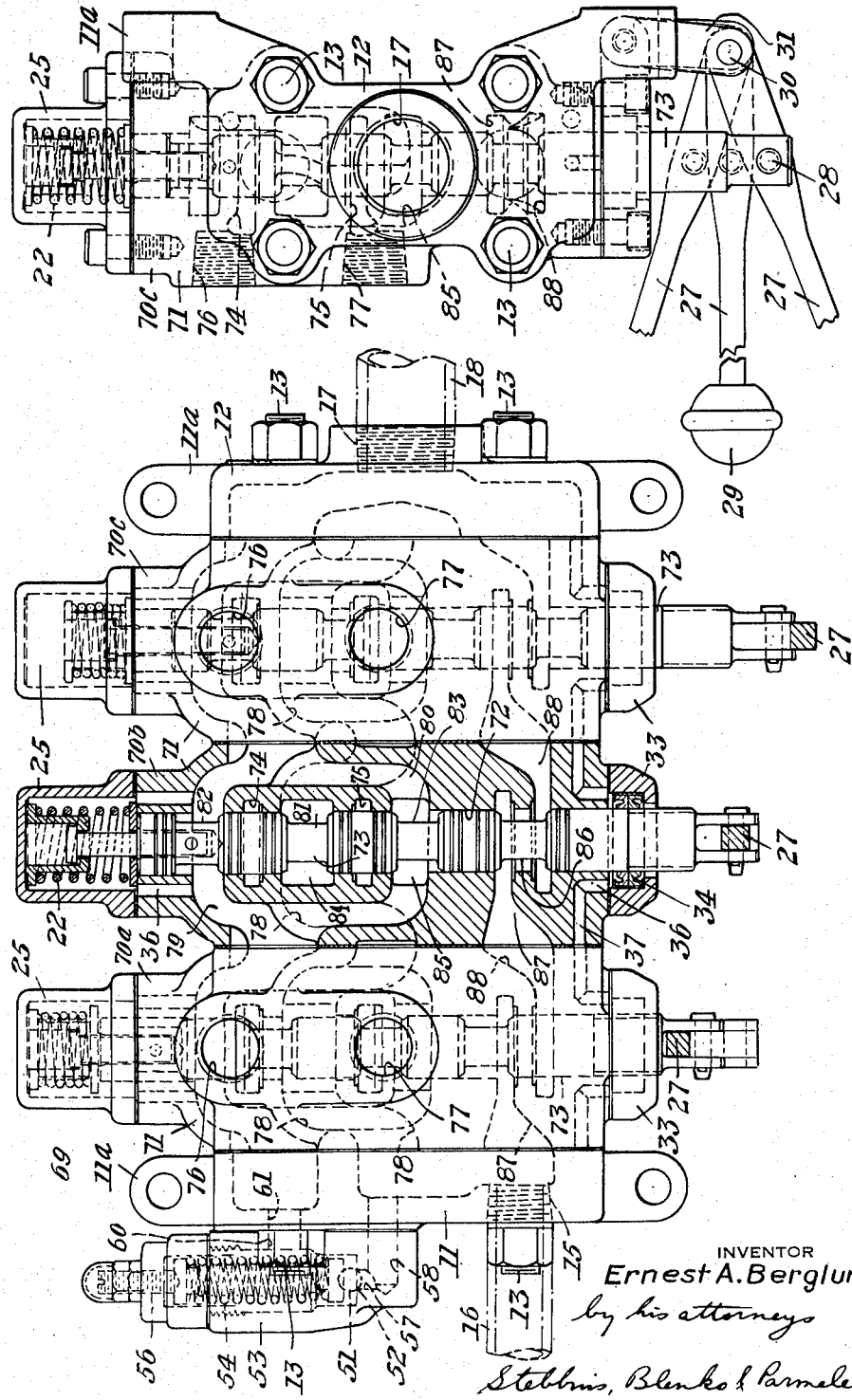

July 14, 1942.　　　E. A. BERGLUND　　　2,289,567

VALVE

Filed March 7, 1938　　　4 Sheets-Sheet 4

INVENTOR
Ernest A. Berglund
by his attorneys
Stebbins, Blenko & Parmelee

Patented July 14, 1942

2,289,567

UNITED STATES PATENT OFFICE 2,289,567

VALVE

Ernest A. Berglund, Youngstown, Ohio, assignor, by mesne assignments, to Vickers Incorporated, Detroit, Mich., a corporation of Michigan Application March 7, 1938, Serial No. 194,363

9 Claims. (Cl. 277—57)

This invention relates to valves and, in particular, to multiple hydraulic valves of the piston type.

Multiple hydraulic valves are extensively used in controlling the operation of fluid motors such as pistons reciprocable in cylinders by means of fluid under pressure. In many applications, both double-acting and single-acting motors are required and it is the object of this invention to provide a valve having units suitable for controlling both types of motors. Further objects of the invention are to provide a simple, compact valve structure which can be manufactured at a relatively low cost and which is susceptible of being arranged in various combinations to suit the needs of a given installation.

In accordance with my invention I provide a valve having a body or casing composed of a plurality of generally similar units assembled in side-by-side relation, the valve body or casing being completed by a pair of end covers disposed along-side the outermost valve units. Inlet and outlet ports formed in these covers communicate by means of suitable passages with high-pressure and low-pressure passages formed in the several units, the passages of each unit registering with each adjacent unit whereby continuous passages are provided for fluid flow. Each unit has a bore therethrough in which a valve piston is reciprocable. The aforementioned passages intersect the bore and a recess in the latter communicates with a motor port. The valve pistons have reduced portions whereby the recesses in the bores of the several units may be placed in communication alternately with the high-pressure and relief passages to operate the motors connected to the motor ports. I also provide by-passing passages in each unit which normally provide a free path for fluid which is desirable in hydraulic systems in which the pressure is developed by a continuously operating pump. This passage is closed by suitable means on operation of any of the valve pistons.

An important feature of the invention is that, within relatively wide limits, almost any convenient number of units may be assembled in a unitary combination for controlling the supply of fluid under pressure from a common source to a variety of motors. Valves for single-acting and double-acting motors may be included in such assembly, the design and dimensions of the two types being sufficiently similar to permit one type to be substituted for another in any combination. This provides a highly flexible arrangement of valve construction.

While the possibility of assembling the desired arrangement of separate units is an important advantage of the invention, it is to be understood that a valve, either single or multiple, embodying the other features of the invention may be of unitary construction. Similarly the end covers may be formed integral with the end valve units, or a plurality of valve units may be included within a single casting.

A complete understanding of the invention may be obtained from the following detailed description thereof which refers to the accompanying drawings illustrating preferred embodiments of the valves for controlling single-acting and double-acting motors. In the drawings:

Figure 1 is a plan view of an assembly of single-acting valve units, one unit being shown in section along a central horizontal plane;

Figure 2 is a side elevation;

Figure 8 is a view similar to Figure 1 showing an assembly of valve units of the double acting type;

Figure 9 is a side view thereof;

Figure 18 is a partial sectional view showing how valve units of both single-acting and double-acting types may be combined in a single assembly.

Figure 3:
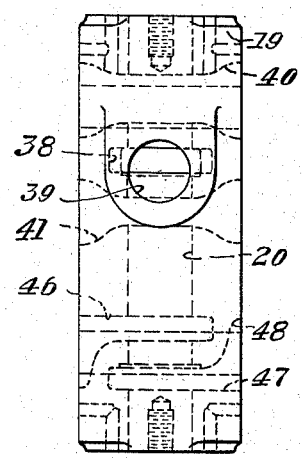
Figure 3 is a plan view of one of the valve units.

Referring now in detail to the drawings and, for the present, to Figures 1 through 7, the valve of my invention comprises a body or casing composed of any desired number of similar units such as shown at 10a, 10b and 10c disposed side by side between end covers 11 and 12. The assembled units and end covers are held together by studs 13 and have gaskets 14 disposed therebetween. Feet 11a are formed on the covers 11 and 12 and provide means whereby the entire valve assembly may be supported on any suitable structure. The cover 11 has an inlet 15 from which extends a pipe connection 16 to a source of fluid pressure such as a continuously operated pump (not shown). Similarly, the end cover 12 has an outlet 17 from which a pipe connection 18 extends to a reservoir or sump from which the pump receives fluid.

The several units 10 are identical so only one of them will be described in detail. Each unit 10 comprises a casting 19, best shown in Figures 3 through 5, having a longitudinal bore 20 therethrough and a valve piston 21 reciprocable in said bore. The piston is normally maintained in centralized position longitudinally of the casting by a spring 22 compressed between a flanged cup 23 and a washer 24. The cup and washer are movable within a cap 25 secured to the end of the casting, the washer 24 being disposed on a stud 21a extending into and pinned to the upper end of the piston while the cup 23 is swiveled on the end of the stud by means of an enlarged head 26.

The pistons of the units 10a and 10c are shown in their opposite extreme positions, while the piston in the unit 10b is shown in its normal position. As will be apparent from the drawings, when one of the pistons is raised, the upper end thereof engages the washer 24 and compresses the spring 22. Similarly, when one of the pistons is moved down, the head 26 on the stud 21a pulls the cup 23 down, thus compressing the spring 22. The springs thus serve to restore the valves to their neutral position when released. An operating lever 27 is provided for each piston, being pivoted thereto at 28. One end of the lever 27 has a handle or knob 29 while the other end is pivoted at 30 to a link 31 which is in turn pivoted at 32 to a closure 33.

The closure 33 is secured to the end of each casting 19 opposite that to which cap 25 is secured. The closure is bored to receive the piston and is provided with fluid seals 34. Gaskets 35 are disposed between the casting and the cap 25 and the closure 33. Intersecting bores 36 and 37 are formed in opposite sides of each unit casting and at both ends thereof. The bores 36 communicate with the space within the cap 25 and closure 33 and the bores 37 of adjacent units register. A continuous passage through the several units of the assembly is thus provided for any fluid which may leak past the ends of the pistons.

Figure 4:
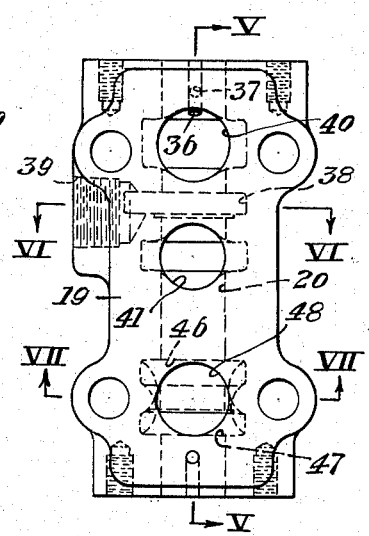
Figure 4 is a side view thereof.
Figure 5:
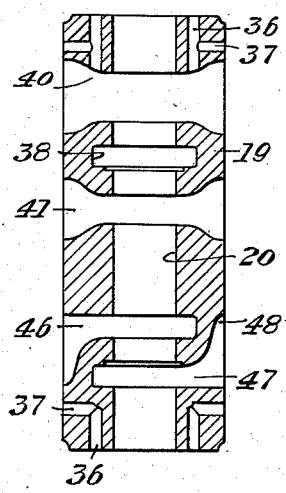
Figure 5 is a sectional view taken along the line V—V of Figure 4.
Figure 6:
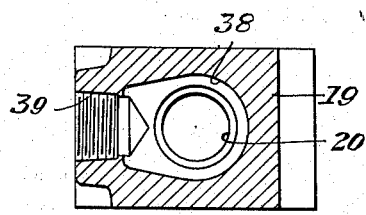
Figures 6 and 7 are sectional views taken along the lines VI—VI and VII—VII of Figure 4.
Figure 7:
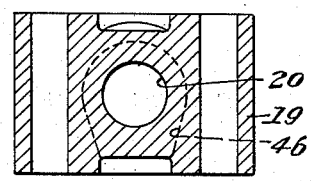

Each unit has a recess 38 communicating with the bore 20. As best shown in Figure 4, the recess 38 intersects a motor port 39 tapped into the unit casting from one side. On opposite sides of the recess 38 passages 40 and 41 extend through the unit intersecting the bore 20. As shown in Figure 1, the passages 40 and 41 of the several units register to form continuous fluid paths. A passage 42 formed in the end cover 11 extends from the inlet 15 and registers with the passage 41 in the casting of unit 10a. A passage 43 in the cover 12 registers with the passage 40 of the casting of the adjacent unit and extends to the outlet 17.

Each of the pistons 21 has recessed portions 44 and 45. These portions are so arranged and dimensioned, as shown in the drawings, that when the piston is moved to its extreme positions, the recess 38 is placed in communication with one or the other of the passages 40 and 41. The piston of unit 10a, for example, is shown with its reduced portion 45 overlapping the recess 38, thus connecting the latter to the passage 41. Conversely the piston of unit 10c is so positioned that its reduced portion 44 overlaps the recess 38 thus connecting the latter to the passage 40.

Each unit casting 19 has by-passing passages 46 and 47. These passages intersect the bore 20 and are spaced axially therealong. The mouths or ports 48 of these passages, however, are enlarged and displaced so that the mouth or port of passage 46 in one casting registers with the mouth or port of the passage 47 in an adjacent casting. For convenience I designate the passage 46 as an inlet by-passing passage and the passage 47 as an outlet by-passing passage.

The piston 21 has a recessed portion 49 which maintains communication between the passages 46 and 47 at all times except when the piston is moved to its uppermost position illustrated in the unit 10a in Figure 1.

A passage 50 in the cover 12 registers with the mouth or port 48 of the outlet by-passing passage 47 in the casting of unit 10c. The passage 50 joins the passage 43 and communicates with the outlet 17.

A relief valve 51 is normally held against a seat 52 in a housing 53 secured to cover 11, by a spring 54. The spring is disposed in a bore 53a and is compressed between disks 55, one bearing on the valve 51 and the other on an adjusting screw 56 threaded into the upper end of the housing 53. The valve seat 52 is formed at the upper end of a passage 58. The passage 58 registers with a passage 59 formed in the cover 11 and branching from the passage 42 therein. A passage 60 is formed in the housing 53 intersecting the bore 53a and extending laterally therefrom. The passage 60 registers with the passage 61 in the cover 11 communicating with a recess 62 therein which registers with the passage 40 of the adjacent valve unit casting.

From the foregoing description, it will be apparent that the passages 40 define a low pressure fluid path to the outlet 17 at all times, regardless of the positions of the pistons 21. Similarly the passages 41 provide a path for high pressure fluid entering the inlet 15 and fluid can flow along this path to the recess 38 of any unit if the piston thereof is raised as in unit 10a, regardless of the positions of the pistons in the other units. Fluid under high pressure is thus always available for the operation of the motor connected to any one of the units. The operation of any one piston does not interfere with the supply of fluid for operating motors controlled by the remaining pistons. The function of the by-passing passages 46 and 47 has already been mentioned, viz., to provide a continuous by-pass except when one of the pistons is so positioned as to connect one of the recesses 38 with the high pressure passage 41.

When the pistons of all units are in the position occupied by the piston of unit 10b, fluid under low pressure circulates freely through the by-passing passage provided by the passages 46 and 47, the fluid circuit being from the pipe connection 16 through the inlet 15, passage 42, the passages 46 and 47 of the several units which are in communication because the recessed portion 49 of the pistons overlaps the passages of each unit, and thence by the passage 50 to the outlet 17 and return pipe 18. By reason of this by-passing circuit, the fluid circulates from the pump through the valve and tank and then back to the pump at low pressure, i. e., only that necessary to overcome the fluid friction in the circuit. This low pressure by-pass circuit is maintained until operation of one of the pistons whereupon it is immediately closed to cause the building up by the pump of sufficient pressure on the entering fluid to cause operation of the motor controlled by the piston which has been moved. If any one of the valve pistons is raised, (e. g.) that of unit 10a, the lower portion of the piston interrupts communication between the passages 46 and 47 because the reduced portion 49 of the piston no longer overlaps both passages. Since the by-passing passage is thus closed, the fluid flows through the passage 42 to the passage 41. Since the reduced portion 45 of the piston of unit 10a overlaps the recess 38, the latter is connected with the passage 41 and fluid is admitted to the motor port 39 and by suitable pipe connections therefrom (not shown) to a hydraulic motor such as a piston and cylinder. The admission of fluid to the cylinder, of course, causes the piston to be extended. The position in which the piston of unit 10a is shown is thus known as the raising position.

If the piston of unit 10a is restored to a neutral position (that in which the piston of unit 10b is illustrated) before the piston of the hydraulic motor reaches the limit of its stroke, the supply of fluid to the motor will be discontinued. Since the recess 38 is not in communication with the passage 40 when the valve piston is in neutral position, the fluid which has been supplied to the hydraulic motor will be trapped therein and retraction of the piston will be prevented. For this reason, the neutral position of the valve piston is known as the holding position.

If the valve piston which has been shifted to the raising position (that in which the piston of unit 10a is illustrated) is not restored to neutral before the piston of the hydraulic motor reaches the limit of its movement, the relief valve 51 will be raised from its seat by the increased pressure built up in the pump, thus by-passing surplus fluid through the passages 42, 58, 57, the bore 53a, the passages 60 and 61, the recess 62, the passages 40 and 43 to the outlet 17. When the valve piston which has been operated to raising position is finally restored to the holding position, the normal by-pass circuit through the passages 46 and 47 is reopened, permitting the spring 54 to reclose the relief valve 51.

When it is desired to permit retraction of the piston of the hydraulic motor, the valve piston of the unit which has been operated is lowered to the position occupied by the piston of unit 10c. In this position of the piston, the normal by-pass through the passages 46 and 47 is maintained. At the same time, the recessed portion 44 of the piston overlaps the recess 38 thereby connecting the motor port to the low pressure or relief passage 40. The fluid which was trapped in the cylinder of the hydraulic motor is then permitted to flow out of the inlet 17 and retraction of the piston of the hydraulic motor follows as the result of spring pressure gravity or whatever force normally tends to produce this action. Single-acting motors, of course, are usually employed only for hoists where there is sufficient force tending to retract the motor piston when the fluid in the cylinder is released. The position in which the piston of unit 10c is shown is known as the lowering position.

Figures 8 through 15 illustrate the construction of a valve unit similar in general to that already described except that it is adapted to control a double-acting motor such as a cylinder and piston. A valve assembly 69 shown in Figure 8 includes valve units 70a, 70b and 70c assembled between the covers 11 and 12 by studs 13, as in the case of the valve assembly of Figure 1. Other parts of the structure of Figure 8 which are identical with corresponding parts of the structure of Figure 1 will be designated by the same reference numerals. The units 70a, 70b and 70c are identical and only one will be described.

Each unit comprises a casting 71 having a longitudinal bore 72 therethrough in which a piston 73 is reciprocable. A cap 25 and a closure 23 are secured to opposite ends of the casting and a spring 22 serves as in the valve units 10a, 10b and 10c normally to maintain the piston 73 in the position in which the piston 73 of the unit 70b is shown.

The bore 72 is provided with recesses 74 and 75 communicating therewith. These recesses like those shown at 38 in Figure 1 preferably take the form of enlargements of the bore. The recesses 74 and 75 communicate with motor ports 76 and 77 tapped to receive pipe connections extending to opposite ends of a hydraulic cylinder.

Figure 11:
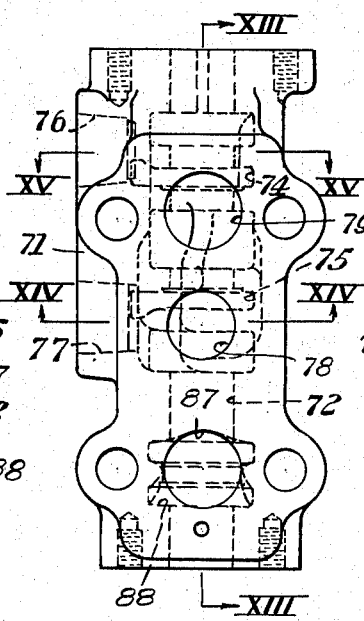
Figure 11 is a side elevation thereof.
Figure 12:
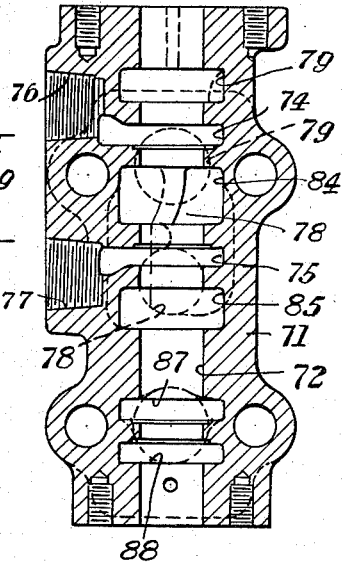
Figure 12 is a sectional view along the line XII—XII of Figure 10.
Figure 13:
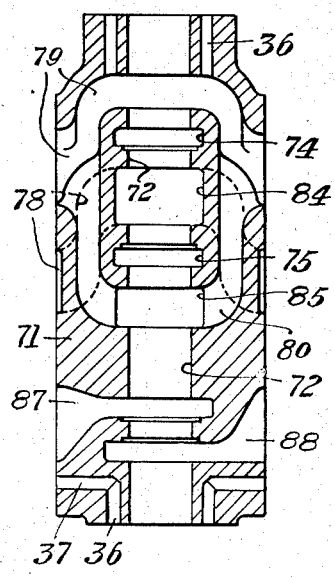
Figures 13, 14 and 15 are sectional views along the lines XIII—XIII, XIV—XIV, XV—XV of Figure 11.
Figure 14:
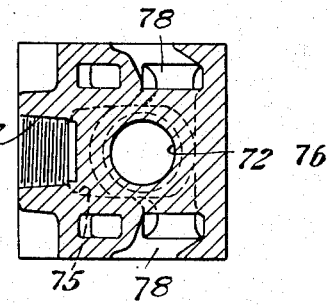
Figure 15:
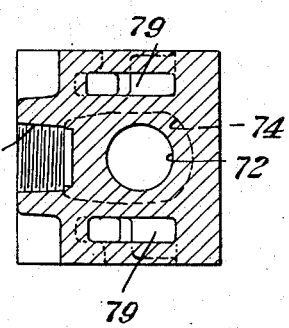

A high-pressure passage 78 extends transversely through the casting and intersects the bore 72 between the recesses 74 and 75. Low-pressure or relief passages 79 and 80 also extend through the casting, branching from common ports on opposite sides thereof and intersecting the bore 72 on the sides of the recesses 74 opposite those on which the high-pressure passage 78 intersects the bore 72. In other words, the high-pressure passage 78 intersects the bore between the recesses 74 and the recesses themselves are within the points of intersection between the low-pressure or relief passages and the bore. It will be understood that the passage 78 is independent of and separate from the passages 79 and 80, although all these passages are formed in the casting 71 by appropriate cores and while the outlets of the passages are vertically alined as shown in Figures 11 and 12, the portions of the passages between the outlets are offset transversely whereby they are maintained separate from each other.

The piston 73 has recessed portions 81, 82 and 83. In the illustrated example, as in the corresponding element of the valve of Figure 1, the recessed portions are formed by turning down the piston. When the piston is moved to its uppermost position (i. e., that in which the piston of unit 70a is shown) the recessed portion 81 overlaps the recess 74 and the intersection between the bore 72 and the passage 78 which is indicated generally at 84. This places the motor port 76 in communication with the passage 78. Simultaneously, the recessed portion 83 of the piston overlaps the recess 75 and the intersection of the low-pressure passage 80 with the bore 72 indicated generally at 85. This places the motor port 77 in communication with the low-pressure passage 80. The hydraulic motor connected to the ports 76 and 77 thus has one end connected to a source of fluid under pressure while the other end is connected to a relief line. An operation of the motor is thus effected and may cause extension or retraction of the piston in the cylinder. Fluid under pressure is supplied to the passage 78 through the connection 16 and inlet 15 in the same manner as in Figure 1. Similarly, the low pressure or relief passages 79 and 80 are connected to a reservoir or sump by a pipe connected to the outlet 17.

The piston 72 also has a recessed portion 86 adapted to cooperate with inlet and outlet bypassing passages 87 and 88 intersecting the bore 72 at points spaced there-along. These passages correspond to those shown at 46 and 47 of Figure 1. Movement of the piston 73 to either of its extreme positions interrupts communication between the passages 87 and 88 which is maintained only so long as all the pistons are in normal position. A free by-pass for the fluid is thus provided except at the times when it is desired to supply fluid under pressure through the passage 78 to cause operation of one of the motors connected to the ports 76 and 77.

Movement of the piston 73 to its lower position (i. e., that in which the piston of unit 70c is illustrated) places the recess 75 and motor port 77 in communication with the high-pressure passage 78 and connects the recess 74 and the port 76 with the low-pressure passage 79. This causes an operation of the motor in a direction the reverse of that of the movement resulting from actuation of the piston to its upper-most position.

Since double-acting motors involve the application of fluid under pressure to cause operation in both directions, the three positions in which the pistons 73 of the units 70a, 70b and 70c are illustrated might be designated the "forward position," the "hold position" and the "reverse position", respectively. Other details of the valve assembly shown in Figures 8 through 15 such as the relief valve, operating levers, etc., are identical with corresponding elements of the valve shown in Figures 1 through 7 and it is unnecessary to repeat the detailed description thereof.

Figures 16, 17:
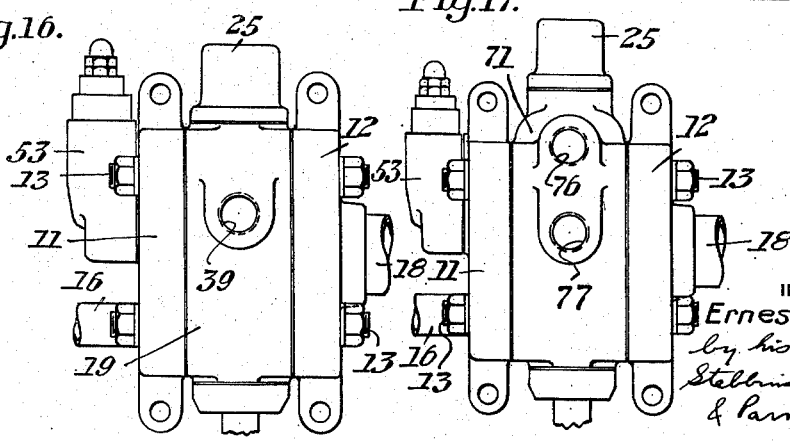
Figure 16 is a plan view of a single-acting valve including only one unit.
Figure 17 is a plan view of a one unit double-acting valve.
Figure 10:
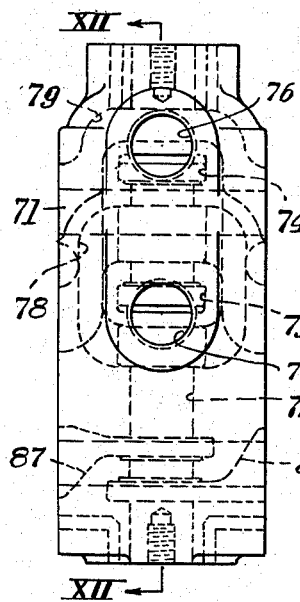
Figure 10 is a plan view of one of the valve units.

The invention is useful not only in assembling multiple valves but also provides a desirable type of single-unit valve. Figures 16 and 17 show, respectively, a single-unit valve of the single-acting and double-acting types. The utility of these valves resides partly in the fact that they may be assembled from standard parts and that the assembled valve may readily be taken apart for inspection.

Figure 18 illustrates how the single-acting and double-acting units of Figures 1 and 8 respectively may be combined in a single assembly. I have shown single-acting and double-acting units only, in Figures 1 and 8, to facilitate the description and explanation thereof but in most practical installations, there will be need for both types of units in a single assembly. As shown in Figure 18, the high-pressure passage 41 extending through the casting 19 registers with the high-pressure passage 78 of the casting 71. Similarly the low-pressure or relief passage 40 registers with the branching passages 79 and 80. The same is true of the outlet and inlet by-passing passages 47 and 87 as well as the drain passages 37. The casting 71 has recesses 89 registering with the drain passages 36 in the upper ends of the castings 19 which place the latter in communication with the relief passage 79.

It will be apparent from the foregoing description that the invention provides a valve structure and arrangement characterized by simplicity, relatively low cost and extreme flexibility to the needs of various applications. It makes possible the assembly of a valve for a given installation from a relatively few standard parts which are freely interchangeable. By using valve pistons in both single-acting and double-acting units, the construction is simplified and operation is made easier. By making the recesses in the piston bores in the form of annular enlargements thereof, the pressure is equalized at all points circumferentially of the valve piston, preventing lateral displacement, binding or uneven wear.

The valve pistons are balanced not only radially but also longitudinally. The portions of the valve pistons adjacent the reduced portions adapted to overlap the recesses communicating with motor ports and the high-pressure passages, are of the same diameter so that the thrust on the pistons exerted by the fluid under high pressure is equal in opposite directions and is, therefore, fully neutralized at all times.

Although I have illustrated and described but a preferred embodiment of each of two types of valves, it will be understood that changes in the construction disclosed may be made without departing from the spirit of the invention or the scope of the appended claims.

While I have mentioned hydraulic motors of the cylinder and piston type only as being adapted to be controlled by the valve disposed herein, it will be evident that such valves may be used to control other types of hydraulic motors as well.

The term "similar units" as used in the claims is not intended to be a limitation to identical units, as the single-acting and double-acting units are generally similar but not identical and both may, as pointed out above, and generally will be, included in a common assembly.

I claim:

1. A control valve bank including a plurality of valves arranged in side by side relation, each valve comprising a body provided with two oppositely facing parallel flat surfaces, a valve member shiftable in said body, pressure, tank and motor ports disposed in said body for selective interconnection by said valve member, each of said pressure and tank ports communicating in all positions of the valve member with pairs of transversely aligned openings in each of said surfaces, at least one motor port connection at the outside of the body outside of said flat surfaces, and a single pair of bypass ports in said body arranged to be separated by the valve member in one position thereof, each bypass port communicating with only one of a pair of transversely aligned openings in said flat surfaces, said bank including end plates having pressure and tank passages each registering with the bypass opening of one end valve of the bank and also registering, one with the tank opening at one end valve and the other with the pressure opening of the other end valve, and means for holding said bank together with the flat surfaces of adjacent valves in abutment and with the end plates in abutment with the flat surfaces of each end valve of the bank.

2. A multiple valve bank comprising a plurality of abutting valve housings each provided with a longitudinal valve bore for receiving a movable valve member, each of said housings being provided with a transverse pressure passageway open at all times to said bore, with one or more transverse tank passageways, and with a bypass passageway formed of ports in said housing each joining said bore, and one or more motor ports formed in each housing, said transverse and bypass passageways being arranged to form continuous passageways through a plurality of abutting housings, and said valve means each being arranged to connect the bypass ports of a particular housing when in a neutral position and to be shifted to cut off these bypass ports from each other and connect a motor port to a pressure or tank passageway, means at one end of said bank forming a pressure connection to said pressure passageway and said bypass passageways and means at the other end of said bank for blocking said pressure passageway and connecting said bypass passageway to a relief passage.

3. A valve comprising a body having end covers thereon, a bore through said body, a valve piston reciprocable in said bore, a recess in said bore and a motor port communicating therewith, high-pressure and relief passages intersecting said bore, an inlet in one of said covers and an outlet in the other communicating respectively with said high-pressure and relief passages, said piston having recessed portions adapted to place said recess in communication with one or the other of said passages when said piston is so positioned that said portions overlap said recess, by-passing passages intersecting said bore, one of said passages being adapted to communicate with the inlet in said one of said covers, the other cover having a passage adapted to communicate with the other of said by-passing passages, and a recessed portion on said piston adapted to maintain communication between said by-passing passages at all times except when said recess is in communication with said high-pressure passage.

4. A valve comprising a plurality of similar units assembled side by side between end covers, each unit having a bore therethrough with a valve piston reciprocable therein, a recess opening into said bore, a motor port communicating with said recess, high-pressure and relief passages intersecting said bore, an inlet in one of said covers and an outlet in the other, said piston having recessed portions adapted to place said recess in communication with one or the other of said passages when said piston is so positioned that the portions overlap said recess, the passages of the several units registering with each other, passages in said covers registering with the passages in the units adjacent thereto, the passages in said covers extending to said inlet and outlet, each of said units having by-passing passages intersecting its bore, and each of said pistons having a recessed portion effective to maintain communication between said by-passing passages at all times except when said recess is in communication with said high-pressure passage, the by-passing passages of each unit registering with those of adjacent units, and the by-passing passages in the units adjacent the end covers registering with the passages therein leading to the inlet and outlet.

5. A valve comprising a plurality of similar units assembled side by side between end covers, each unit having a bore therethrough with a valve piston reciprocable therein, a recess opening into said bore, a motor port communicating with said recess, high-pressure and relief passages intersecting said bore, an inlet in one of said covers and an outlet in the other, said piston having recessed portions adapted to place said recess in communication with one or the other of said passages when said piston is so positioned that said portions overlap said recess, the passages of the several units registering with each other, passages in said covers registering with the passages in the units adjacent thereto, the passages in said covers extending to said inlet and outlet, each of said units having inlet and outlet by-passing passages intersecting its bore and spaced axially therealong, and each of said pistons having a recessed portion effective to maintain communication between said by-passing passages at all times except when said recess is in communication with said high-pressure passage, the by-passing passages of each unit registering with those of adjacent units, and the by-passing passages in the units adjacent the end covers registering with the passages therein leading to the inlet and outlet, the by-passing passages having ports so disposed and arranged that the port of the outlet by-passing passage of one unit registers with the port of the inlet by-passing passage of the adjacent unit.

6. A valve comprising a casing having an inlet and an outlet, bores through said casing, each bore having a valve piston reciprocable therein, a recess in each bore controlled by the piston therein and communicating with a motor port in said casing, high-pressure and relief passages intersecting said bores on opposite sides of said recesses and communicating respectively with said inlet and outlet, said pistons each having recessed portions which place the recess controlled thereby in communication with said passages when the pistons are so positioned that their recessed portions overlap said recesses, by-passing passages intersecting said bores and communicating with said inlet and outlet respectively, and another recessed portion in each of said pistons adapted to maintain communication between the by-passing passages except when the pistons are so positioned that their first-mentioned recess overlaps the intersection of the high-pressure passage with said bore and one of said recesses.

7. A valve comprising a body having end covers thereon, a bore through said body, a valve piston reciprocable in said bore, a recess in said bore and a motor port communicating therewith, high-pressure and relief passages intersecting said bore, an inlet in one of said covers and an outlet in the other communicating respectively with said high-pressure and relief passages, said piston having recessed portions adapted to place said recess in communication with one or the other of said passages when said piston is so positioned that said portions overlap said recess, by-passing passages intersecting said bore, one of said passages being adapted to communicate with the inlet in said one of said covers, and the other with the outlet, and a recessed portion on the piston, of a length greater than the spacing of said bypassing passages, whereby the last-mentioned recess will overlap said bypassing passages while one of the other recessed portions overlaps the recess and the relief passage, and also while neither of the other recessed portions overlaps the recess.

8. A valve unit for controlling a single-acting motor when mounted in a multiple valve bank with end covers providing inlet and outlet connections comprising a body having a longitudinal bore therethrough, a motor port recess in said bore, high pressure and exhaust passageways extending through the body and through the bore, a pair of bypassing passageways communicating with said bore at spaced points therein, one communicating with the inlet and the other with the outlet, a valve spool slidable in said bore and having lands and recesses to provide three-position, three-way valve action as between the motor port and said pressure and relief passageways, including neutral position, pressure applying position and exhausting position, and means on the spool for maintaining said bypassing passageways in communication with each other in both the neutral position and the exhausting position of the spool.

9. A multiple valve bank comprising a plurality of valves, each having longitudinal valve bores, pressure and tank passageways extending through the bank and intersecting each bore, at least one motor port in each bore and communicating with the outside of the respective valves, a single by-pass passageway extending through the bank and intersecting each valve bore at spaced points therein, a common inlet connection to the bank and in permanently open communication with the pressure passageway and one end of the by-pass passageway, a common outlet from the bank and in permanently open communication with the tank passageway and the other end of the by-pass passageway, and a shiftable valve plug in each bore and having recesses to selectively connect said ports and passageways and arranged to block the by-pass passageway between said spaced points whenever the plug is shifted to connect a motor port with the pressure passageway.

ERNEST A. BERGLUND.